INVENTOR.
Vladimir Ignatjev
BY
ATTORNEY.

United States Patent Office 3,347,603
Patented Oct. 17, 1967

3,347,603
AXIAL BEARING
Vladimir Ignatjev, 39 Ledgewood Drive,
Norwalk, Conn. 06850
Filed Apr. 12, 1965, Ser. No. 447,290
4 Claims. (Cl. 308—6)

ABSTRACT OF THE DISCLOSURE

An axial bearing consisting of an annulus having a plurality of apertures formed therein each communicating with the surrounded central passage. A conduit or groove is formed within said annular housing connecting each such formed aperture with the two apertures adjacent thereto, the conduit or groove being concentric with the annular housing. A plurality of bearing members are provided, one in each of said apertures, each of said bearing members having formed centrally thereof a bore having a configuration such as that which would be described by a segment of the groove rotated 360°, said bearing members being mounted to rotatively engage a circular axle passing through said conduit or groove.

---

This invention relates generally to the field of bearings. More particularly, it relates to a new and improved axial bearing which offers marked advantages over what has been known to the art, both in terms of simplicity, inexpensiveness of construction, improvement in performance, and suitability for miniaturization.

Axial bearings, i.e., bearings axially disposed about a central aperture through which the supported member passes, though known for many years have been characterized by their relatively high cost, as for example ball bushings, or else have been extremely bulky and totally unsuited for application where only a limited space is available.

Accordingly, it is an object of this invention to provide an improved axial bearing.

It is a further object of this invention to provide an axial bearing that will provide efficient performance yet be simple and inexpensive to manufacture and be capable of miniaturization.

Other and further objects and advantages of the invention will become clear when the following description is read in conjunction with the accompanying drawings. The scope of the invention will be pointed out with particularity in the appended claims.

Briefly stated, in accordance with the invention there is provided an axial bearing consisting of an annulus having a plurality of apertures formed therein each communicating with the surrounded central passage. A conduit or groove is formed within said annular housing connecting each such formed aperture with the two apertures adjacent thereto, the conduit or groove being concentric with the annular housing. A plurality of bearing members are provided, one in each of said apertures, each of said bearing members having formed centrally thereof a bore having a configuration such as that which would be described by a segment of the groove rotated 360°, said bearing members being mounted on a circular axle.

Figure 1:
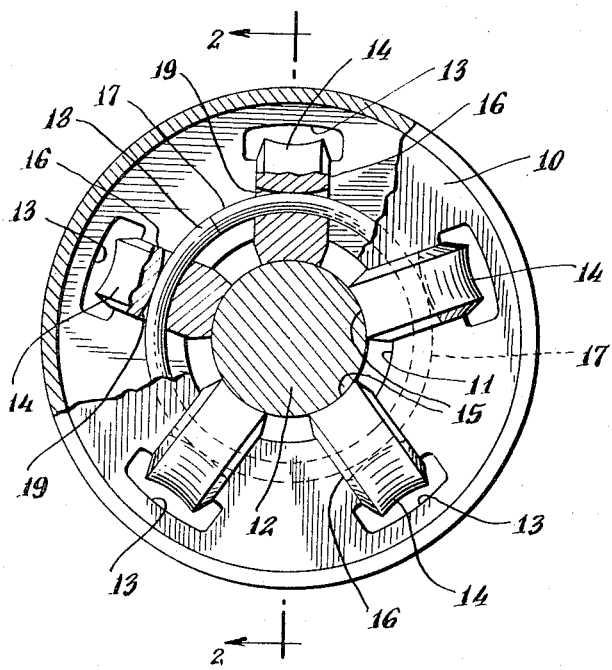
FIGURE 1 is a plan view, partially in section, of a preferred embodiment of the invention.
Figure 2:
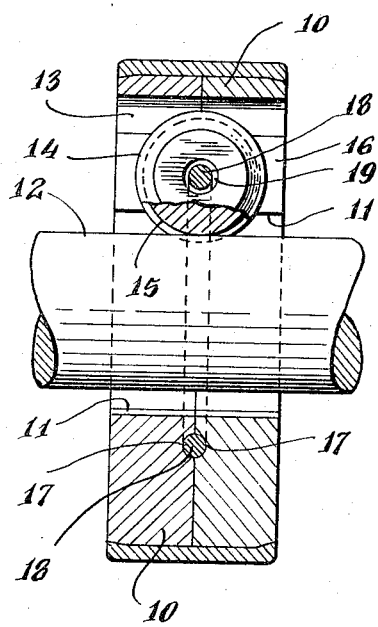
FIGURE 2 is a side view, partially in section, of the device shown in FIGURE 1.

Referring now to the figures, the axial bearing of the invention includes a ring shaped or annular housing 10 having a central aperture or annulus core 11 through which the member to be supported, shown as reference numeral 12, passes. Within annular housing 10 are a number of chambers 13, each formed to snugly enclose a portion of a bearing member 14. Chambers 13 are preferably equispaced about the housing. Five such chambers and their accompanying bearing members 14 are shown in FIGURE 1. It is preferable that an odd number of bearing members be provided, but this is decreasingly important as the number of bearing members increases past three.

Bearing members 14 are shown as cylindrical in shape, having concave bearing surfaces 15, though this is not essential. It is important that sides 16 of bearing members 14 be supported by the walls of chambers 13, and that bearing surfaces 15 be flat or concave, not convex, so as to minimize the possibility of their being forced off center by the supported shaft. Since the invention is particularly adapted for use in precision applications, bearing surfaces 15 may be machined or otherwise formed to conform to the surface of the shaft to be supported as may be seen in FIGURE 1. It may be noted, in passing, that the desirability of closely confining bearing members 14 in their respective chambers 13 provides the advantage of lubricant retention in the aperture 19 formed in each bearing member 14. It will be appreciated that while chambers 13 are preferably designed to closely contain bearing members 14 along their sides 16, the top portions 13a of the chambers are not critical so long as the dimensions do not interfere with rotation of bearing members 14.

Chambers 13 each communicate with the central core 11 of annulus 10, so that when in place, each of bearing members 14 extend into the annulus core.

Within housing 10 is a groove 17 connecting each of chambers 13 to the adjacent chambers, groove 17 being adapted to receive and contain a circular axle 18. As will be described in more detail below, each of bearing members 14 has an aperture 19 formed therein, and the bearing members 14 are threaded by axle 18 to assist in retaining the bearing members and also to limit their freedom of rotation so that they rotate about the axle 18 toward the center of the annular core, i.e. radially.

Figure 3:
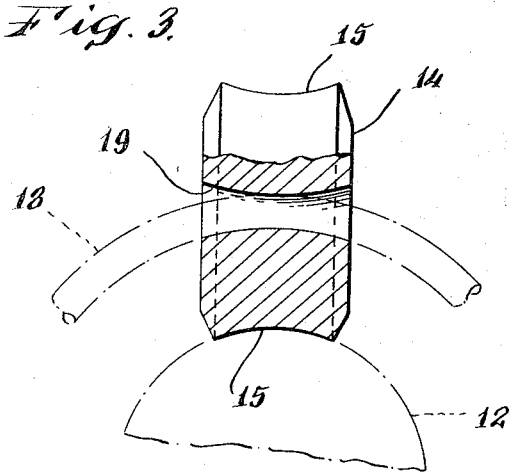
FIGURES 3 and 4 are detailed views of a bearing member, partially in section, employed with the device of FIGURES 1 and 2.
Figure 4:
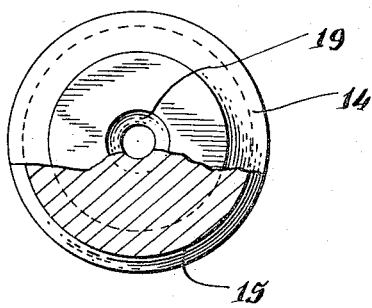

The shape of the apertures 19 in bearing members 14 is that which would be generated were a segment of axle 18 rotated 360°. This may be most clearly seen in FIGURE 3 and may be provided by suitable boring operations. By virtue of the structure shown, a circular array of bearing surfaces may be provided much more densely packed than has previously been possible since there is not the need for a separate axle or mount for each separate bearing surface. This is particularly important where size is a consideration. The devices known to the prior art being virtually incapable of such use.

It has been found desirable to construct the invention by forming two mating halves of the annulus, as for example illustrated in FIGURE 1, then assembling after insertion of the mounted bearing members and their axle, the assembled unit being secured by an outer ring of any suitable material such as rubber, plastic, metal, etc.

While what has been shown and described above is believed to be the best mode and a preferred embodiment of the invention modifications and variations may be made therein, as will be clear to those skilled in the art, without departing from the spirit of the invention. Accordingly, the scope of the invention is intended to be limited solely by the appended claims.

What is claimed is:

1. A shaft supporting device including in combination, an annular housing, a plurality of chambers formed in said housing and communicating with the core of said annulus, a groove formed within said housing connecting each of said chambers, an axle member disposed within said groove, a bearing member located within each of said chambers, each of said bearing members having a bearing surface extending within said annulus core, an aperture formed through each of said bearing members, said bearing member aperture having a shape defined by the rotation of an arc whose radius of curvature is equal to the radius of curvature of said axle, said axle passing through each of said bearing members aperture and said bearing members rotatively engaging said axle, along radii of said annular housing.

2. A shaft supporting device including in combination, an annular housing, a plurality of equispaced chambers formed in said housing and communicating with the core of said annulus, a groove formed within said housing connecting each of said chambers, an axle member disposed within said groove, a bearing member located within each of said chambers, each of said bearing members having a bearing surface extending within said annulus core, an aperture formed through each of said bearing members, said bearing member aperture having a shape defined by the rotation of an arc whose radius of curvature is equal to the radius of curvature of said axle passing through each of said bearing members, said bearing members rotatively engaging said axle, along radii of said annular housing.

3. A shaft supporting device including in combination, an annular housing, at least three equispaced chambers formed in said housing and communicating with the core of said annulus, a groove formed within said housing connecting each of said chambers, an axle member disposed within said groove, a bearing member located within each of said chambers, each of said bearing members having a bearing surface extending within said annulus core, an aperture formed through each of said bearing members, said bearing member aperture having a shape defined by the rotation of an arc whose radius of curvature is equal to the radius of curvature of said axle, said axle passing through each of said bearing members aperture, and said bearing members rotatively engaging said axle, along radii of said annular housing.

4. The device defined in claim 1 wherein the bearing surface of each of said bearing members is formed so that the plurality of bearing surfaces extending within said annulus core lie on a closed curve corresponding to the curve of the shaft to be supported within said annulus core.

References Cited

UNITED STATES PATENTS 2,903,307   9/1959   Peters ---------------- 308—6

FOREIGN PATENTS 1,017,410   12/1952   France.
845,675   8/1960   Great Britain.

OTHER REFERENCES

German printed application 1,007,576, May 1957.

EDGAR W. GEOGHEGAN, *Primary Examiner.*

MARTIN P. SCHWADRON, *Examiner.*

L. L. JOHNSON, *Assistant Examiner.*